United States Patent
Zhang

(10) Patent No.: US 10,657,659 B1
(45) Date of Patent: May 19, 2020

(54) VISUAL SIMULTANEOUS LOCALIZATION AND MAPPING SYSTEM

(71) Applicant: Guoxuan Zhang, Flushing, NY (US)

(72) Inventor: Guoxuan Zhang, Flushing, NY (US)

(73) Assignee: Slightech, Inc.

( * ) Notice: Subject to any disclaimer, the term of this patent is extended or adjusted under 35 U.S.C. 154(b) by 227 days.

(21) Appl. No.: 15/979,893

(22) Filed: May 15, 2018

Related U.S. Application Data

(60) Provisional application No. 62/570,195, filed on Oct. 10, 2017, provisional application No. 62/593,326, filed on Dec. 1, 2017.

(51) Int. Cl.
| | |
|---|---|
| H04N 13/00 | (2018.01) |
| G06K 9/00 | (2006.01) |
| G06T 7/269 | (2017.01) |
| G06T 7/579 | (2017.01) |
| H04N 13/271 | (2018.01) |
| G06T 7/246 | (2017.01) |

(52) U.S. Cl.
CPC .............. *G06T 7/269* (2017.01); *G06T 7/248* (2017.01); *G06T 7/579* (2017.01); *H04N 13/271* (2018.05); *G06T 2207/10028* (2013.01); *G06T 2207/30244* (2013.01)

(58) Field of Classification Search
USPC ....... 382/100, 103–104, 106, 154, 162, 168, 382/173, 177, 181, 190, 199, 209, 219, 382/231, 254, 274, 276, 285–294, 305, 382/312; 348/42, 47, 48
See application file for complete search history.

(56) References Cited

U.S. PATENT DOCUMENTS

| | | | | |
|---|---|---|---|---|
| 9,092,665 | B2 * | 7/2015 | Stoppa | G06K 9/00355 |
| 9,129,155 | B2 * | 9/2015 | Stoppa | G06K 9/4671 |
| 2014/0211991 | A1 * | 7/2014 | Stoppa | G06K 9/00355 |
| | | | | 382/103 |
| 2016/0310761 | A1 * | 10/2016 | Li | A61N 5/1038 |
| 2017/0154219 | A1 * | 6/2017 | Shin | G06K 9/4604 |
| 2018/0211399 | A1 * | 7/2018 | Lee | G06T 7/579 |

* cited by examiner

*Primary Examiner* — Seyed H Azarian
(74) *Attorney, Agent, or Firm* — Quickpatents, LLC; Kevin Prince

(57) ABSTRACT

A system and method for the visual simultaneous localization and mapping can quickly and accurately localize an object in space and map the surrounding environment. This is accomplished using at least one camera and a synthetic gradient field for tracking the pose of the camera and optimizing the 3D point map. More specifically, a sequence of image frames taken from the camera is used to compute the relative transformation between camera poses and generate a map of the surrounding environment.

13 Claims, 6 Drawing Sheets

VISUAL SIMULTANEOUS LOCALIZATION AND MAPPING SYSTEM

CROSS-REFERENCE TO RELATED APPLICATIONS

This application claims the benefit of U.S. Provisional Patent Application 62/570,195, filed on Oct. 10, 2017, and U.S. Provisional Patent Application 62/593,326, filed on Dec. 1, 2017, both of which are incorporated herein by reference.

STATEMENT REGARDING FEDERALLY SPONSORED RESEARCH AND DEVELOPMENT

Not Applicable.

FIELD OF THE INVENTION

This invention relates to a system and method for visual simultaneous localization and mapping, and more particularly, to localize an object in 3D space and map the surrounding environment using a camera.

DISCUSSION OF RELATED ART

As humans, we have an innate ability to view an image and identify objects, their depth and distance from other objects, lighting, perspective, and various other features. For machines, though, this task is much more difficult, especially in fields such as computer vision and autonomous driving. Edge detection, also called step detection, can generally be described as identifying points in a digital image that represent a boundary or perimeter of an object. Edge detection typically uses an algorithm that will compare brightness differences between adjacent pixels and determines whether or not an edge is present, if at all. Machines use edge detection to make determinations as to what objects or features are in an image, and what characteristics those objects have (depth, orientation, lighting, etc.).

In the same vein, while humans can quickly understand our environment by taking a look around and identifying walls, trees, roads, and mountains without much more than a glance, machines must employ sophisticated algorithms to make these determinations. Simultaneous localization and mapping (SLAM) can generally be described as an algorithm for constructing an environment based on input from various sensors and updating the machine's pose within this environment. SLAM is a very resource-intensive task, and as such, SLAM algorithms are tailored to produce usable environments with any available resources as opposed to creating perfect environments that may frustrate the purpose of the machine.

As technology continues to progress and improve, it is inevitable that we will try to augment our world using machines. A core aspect in this augmentation is the ability for a machine to localize itself within our world and identify other objects as quickly and efficiently as possible. While this technology exists today, it often requires several types of sensors, involves time-consuming algorithms that are impractical to use, and has difficulty mapping other objects in a given space. Therefore, there is a need for a system and method that can quickly and accurately localize an object in space and map the environment using a camera. The present invention accomplishes these objectives.

SUMMARY OF THE INVENTION

The present device is a system and method for visual simultaneous localization and mapping that can quickly and accurately localize an object in space and map the surrounding environment. This is accomplished using at least one camera and a synthetic gradient field for tracking the position or pose of the camera. More specifically, a sequence of image frames taken from the camera is used to compute the relative transformation between camera poses and build a map of the environment.

A synthetic gradient field can be generated using a processing unit to create a 2D data structure based on the original image frame. The synthetic gradient field is created for the purpose of both localization and mapping. Thus, one or more synthetic gradient fields can be used with SLAM technology for front end pose tracking and back end bundle adjustment. In at least one embodiment, a synthetic gradient field generates a dense and continuous gradient function in a discretized feature space.

In the preferred embodiment, the synthetic gradient field can be used to create an approximation of a dense feature data distribution in a synthetic grid space. The system starts from an initial edge image frame, after which the synthetic gradient field expands the field inwards and/or outwards towards neighboring space with one grid step size per each step. The system starts with an initial value of the synthetic gradient field. Next, the system can move stepwise around the initial input to determine a value that is changed stepwise by step over step over N steps. At each step, the value is changed linearly or nonlinearly until it reaches to 0 or it reaches other expanding grid cells. In the expansion, each value $V_i$ at step i or VN at step N can be a scalar value (positive or negative) or a two dimensional or higher dimensional vector value. The ultimate goal of the present invention is to create a synthetic gradient field structure that operates as a dense and continuous gradient function in a discretized feature data space.

The present invention is intended to produce practical results using a single camera providing input image frames. Furthermore, the present invention is adaptable with additional cameras and localization sensors for improved accuracy, if required. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

The present invention comprises a system and method for visual simultaneous localization and mapping, where a camera is used to generate and navigate through a 3-Dimensional (3D) environment that mimics real-world surroundings. This is accomplished through a Synthetic Gradient Field (hereinafter SGF), where images gathered by the camera are used to create a 3D environment and track the pose of the present invention within that environment.

In the preferred embodiment, the present invention comprises a sensor platform 20 with at least one microprocessor 23, at least one image sensor 30-33, and a non-transitory computer-readable storage medium 29 in electrical communication with the microprocessor 23 and at least one image sensor 30-33. The at least one image sensors 30-33 are adapted to take a plurality of images of a surrounding space and the microprocessor 23 is adapted to calculate at least one SGF to estimate at least one condition of a pose of the sensor platform 20 in 3D space. The images and the SGF are stored on a non-transitory computer-readable storage medium 29.

Figure 1A:
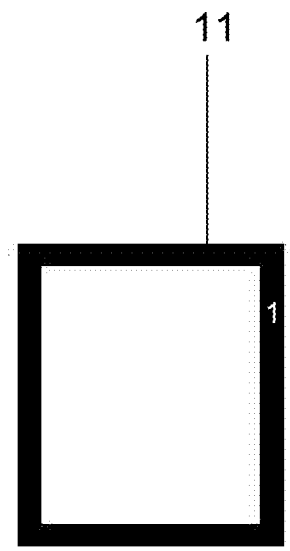
FIG. 1A illustrates a preprocessed edge image extracted from an image frame.
Figure 1B:
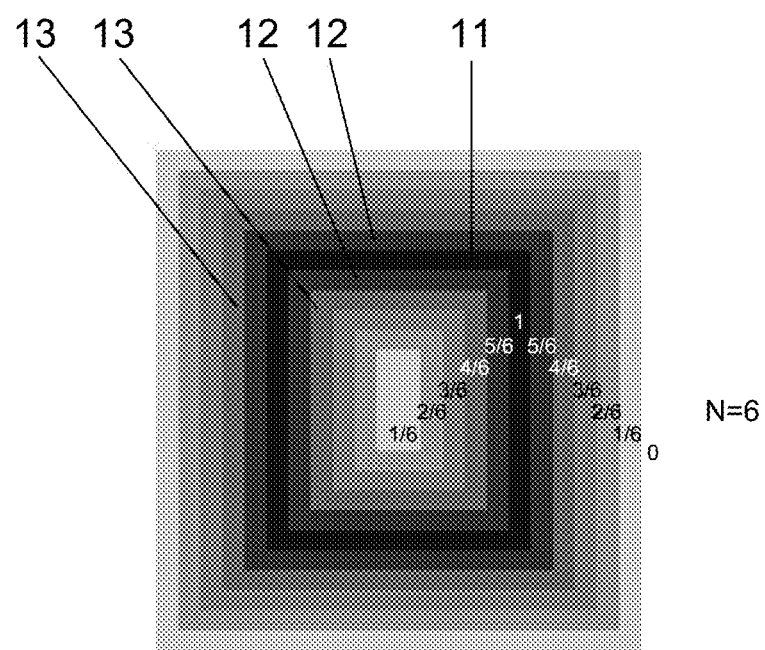
FIG. 1B illustrates a synthetic gradient field generated from the edge image of FIG. 1A.

Referring to the drawings, FIGS. 1A and 1B illustrate how a SGF is created in a two-dimensional (2D) feature space. FIG. 1A illustrates a preprocessed edge image extracted from an image frame captured by the image sensors 30-33. Each pixel grid is assigned an initial value 11 depending on varying preprocessing algorithms. The initial value 11 can take the same value for all grids or different values based on the location and data configuration. Furthermore, the initial value 11 can be a scalar value (positive or negative), or a two (or higher) dimensional vector value. For example, the initial value 11 can take the form of a scalar intensity value, a unit 2-vector edge gradient value, or both. FIG. 1B illustrates a SGF is generated from FIG. 1A. At the center grids, the SGF takes the same shape and the same initial value 11 as FIG. 1A. For example, in FIG. 1A, the initial value 11 takes value 1 for all grids. Next, the grid is expanded to the surroundings in the following manner: the grid value is changed step by step over N steps (6 steps in FIG. 1B), where at each step is changed linearly or nonlinearly (linear value of ⅙ in FIG. 1B), until it reaches to a value approaching 0 or approaches other expanding grid cells. The SGF generates a dense and continuous gradient field in a discretized feature space. Examples of the different values 11, 12, and 13 are shown in FIG. 1B.

Figure 2:
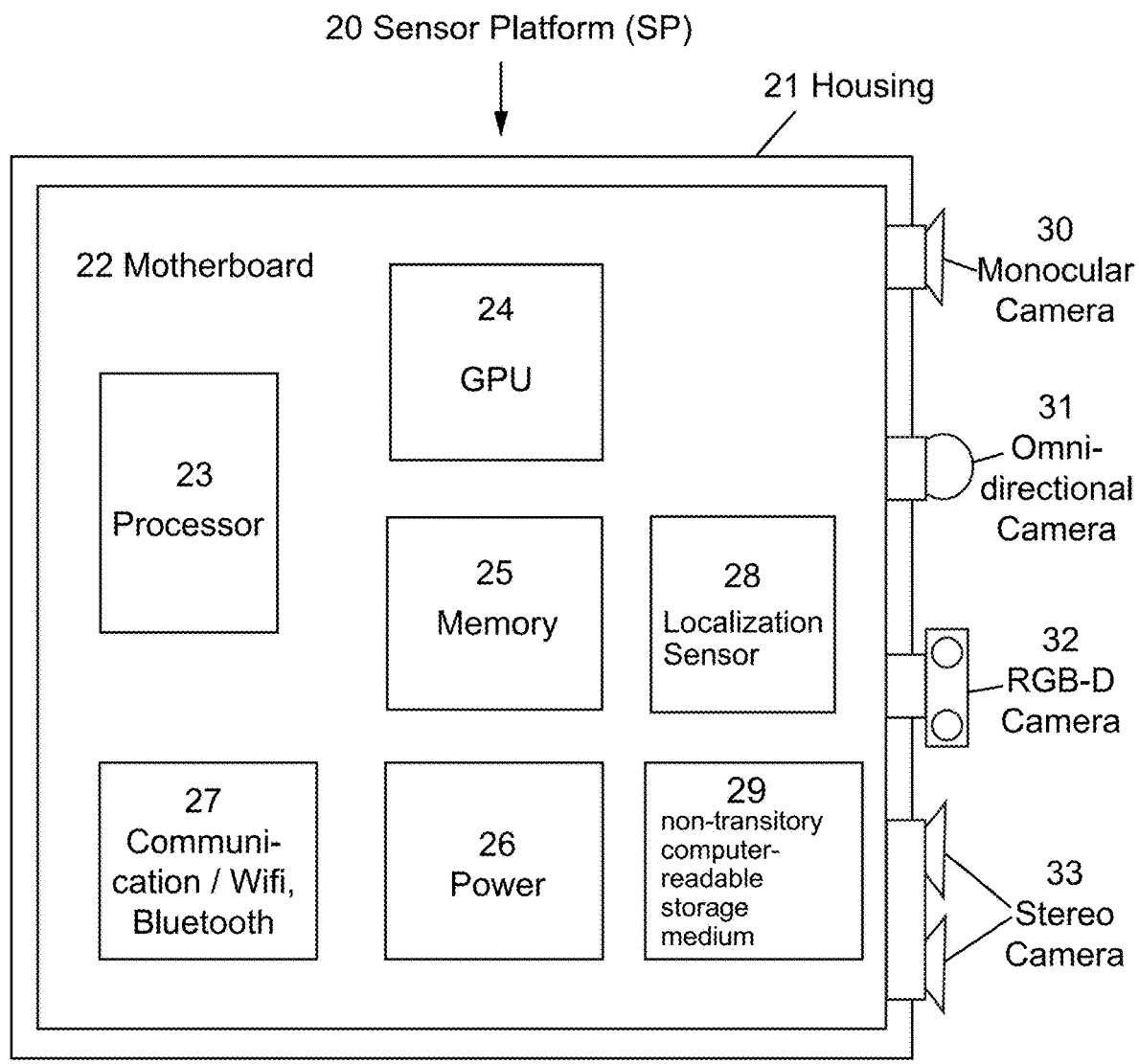
FIG. 2 is a diagram schematically illustrating the components of the present invention.

FIG. 2 illustrates the system diagram of the sensor platform 20. The sensor platform includes a housing 21 which is configured to house a motherboard 22. The microprocessor (CPU) 23, Graphics Processing Unit (GPU) 24, memory 25, and power supply 26 are in electrical communication via the motherboard 22. The power supply 26 can be in the form of a battery or any other suitable form of battery supply such as direct A/C power to the housing and will provide electrical power to all components on the motherboard 22. The CPU 23 and GPU 24 can be any form of suitable central and parallel processing units configured to perform or control a plurality of different steps such as those shown in FIG. 3 and create the SGF shown in FIG. 4. With respect to the memory 25, RAM can mean any type of suitable memory including flash memory, or including semi-permanent memory such as ROM as well. Information from RAM is then processed in the processing units 23/24 and then communicated to other devices via a communication chip or WIFI chip 27. A localization sensor 28, generally in the form of a GPS or IMU, is disposed on the device and is configured to track a measure of movements of the object through a space. Readings from the localization sensor 28 are delivered into the memory 25 and then fed into processing units 23/24, all of which are stored on the non-transitory computer-readable storage medium 29. The reading of the localization sensor 28 is then be used to improve the computation of the pose of the sensor platform 20. Alternative movement systems can also be used such as through WIFI 27 or cellular triangulation or through other types of movement tracking methods known in the art.

In the preferred embodiment, the image sensor is a camera or combinations of cameras 30-33 which are used to compute the pose of the sensor platform 20 relative to other objects in space. The inputs of these cameras 30-33, along with readings from the localization sensor 28, are then delivered to the processing units 23/24, wherein the information is then used to compute the SGF and the change in pose of an object in relation to the surrounding environment. The processing unit 23 can then pass this information onto the communication chip or WIFI chip 27 to communicate with an outside computer such as a server or other device on a network.

Figure 3:
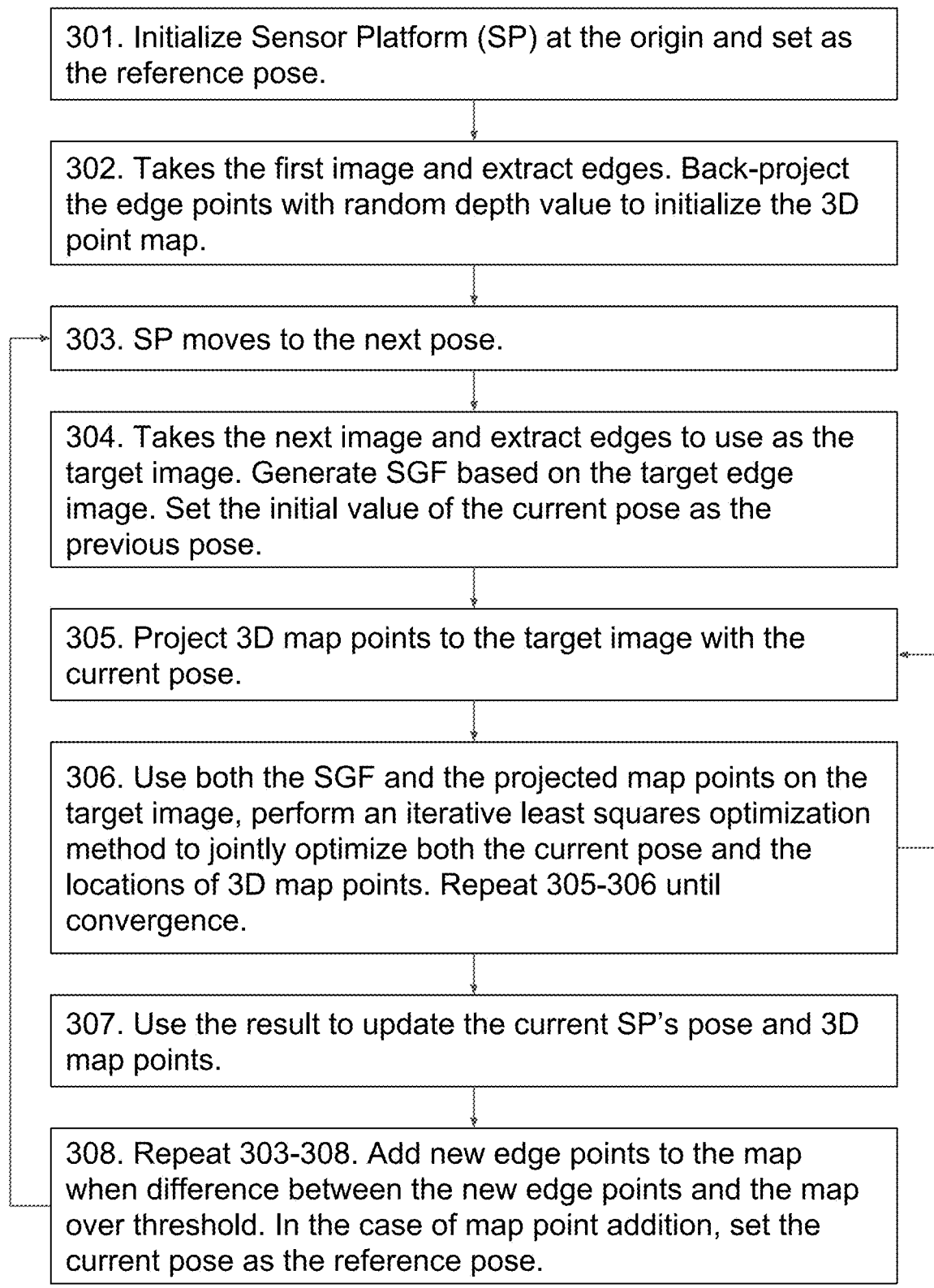
FIG. 3 is a flowchart illustrating a visual simultaneous localization and mapping process.

FIG. 3 illustrates a flow chart where an image frame, captured by the camera 30-33, is used to create a SGF to compute the movements and the surroundings of the sensor platform 20 in 3D space. In this process, step 301 includes initializing the sensor platform 20 at the origin point and sets the origin as its initial reference pose. The initial reference pose is based upon both the position of the sensor platform 20 in space as well as the orientation of the platform 20 in space. Therefore, if the position of a central region of the sensor platform 20 does not change position, but the orientation of the platform 20 changes due to rotation of the platform 20 around an axis, the platform 20 would assume a new pose. In at least one embodiment, the initial image frame is determined by a camera 30-33 before the sensor platform 20 is moved.

Next, in step 302, the present invention takes the first image, extracts the edges, and assigns an initial value 11 to each edge point. The value 11 can be assigned with a uniform value 1 for all edge points, the normalized unit 2-vector gradient value computed from each edge point, or the combination of both. The camera 30-33 will then back-project the edge points using the intrinsic parameters of the camera 30-33 and a random depth value to initialize the 3D point map. Back-projection is a process of back projecting a 2D point on the image plane into the 3D space based on the intrinsic camera parameters, the 2D coordinates of the image point, and a 3D depth value. Each 3D point keeps the initial value 11 from the edge points. In the case of the RGB-D camera 32 or the stereo camera 33, the initial depth value can be extracted from the depth map of camera 32 or from the stereo triangulation of camera 33.

Next, in step 303, the sensor platform 20 moves to the next pose. As indicated above, a different pose could be in the form of a different position, a different orientation, or both. Next, in step 304, the sensor platform 20 takes the next image and extracts the edges and use the image as the target image. A SGF is generated based upon the target edge image. The expanded process for SGF formation is shown in greater detail in FIG. 4. Before applying the 3D map point projection and the iterative least squares optimization method in the following steps, the initial value of the current pose is set as the previous pose. If there is a localization sensor 28 (GPS/IMU) available on the sensor platform 20, then the processors 23/24 set the initial value of the current pose as the reading from the GPS/IMU 28.

Next in step 305, 3D map points are projected onto the target SGF with the current pose of the sensor platform 20. Next in step 306, both the SGF from the target image and the projected 3D map points on the target SGF are used to perform an iterative least squares optimization method to jointly optimize both the current camera pose and the locations of the 3D map points. The processing units 23/24 repeat steps 305-306 until the least squares optimization method converges to optimal values. The expanded process for the least squares optimization method is shown in greater detail in FIG. 5. At each repeating cycle, the processing units 23/24 uses the optimized values to update the current camera pose and the locations of 3D map points in step 305.

Next in step 307, the final optimal values are used to update the current sensor platform's pose and the locations of the 3D map points. Next, steps 303-308 are repeated, where new edge points are added to an overall map of the system by the camera back-projection process. The difference between the newly observed edge points and the map is determined by checking if new components from the new edge points exceed a threshold value. If the new points exceed the threshold value, the new edge points are added to the map to grow the original map, after which the current pose is set as the reference pose.

In at least one embodiment, the reference pose switching is triggered by the amount of new edge points from the new image frame. In an alternative embodiment, the reference pose switching can also be triggered by the change of position and/or the change of rotation, or any other form of measurable changes from the map configuration or the changes from the sensor platform or from both of them. In a further alternative embodiment, the map points are sparsely added to the map when the new reference pose is generated. In yet a further embodiment, the map points can be densely added to the map at each pose.

Figure 4:
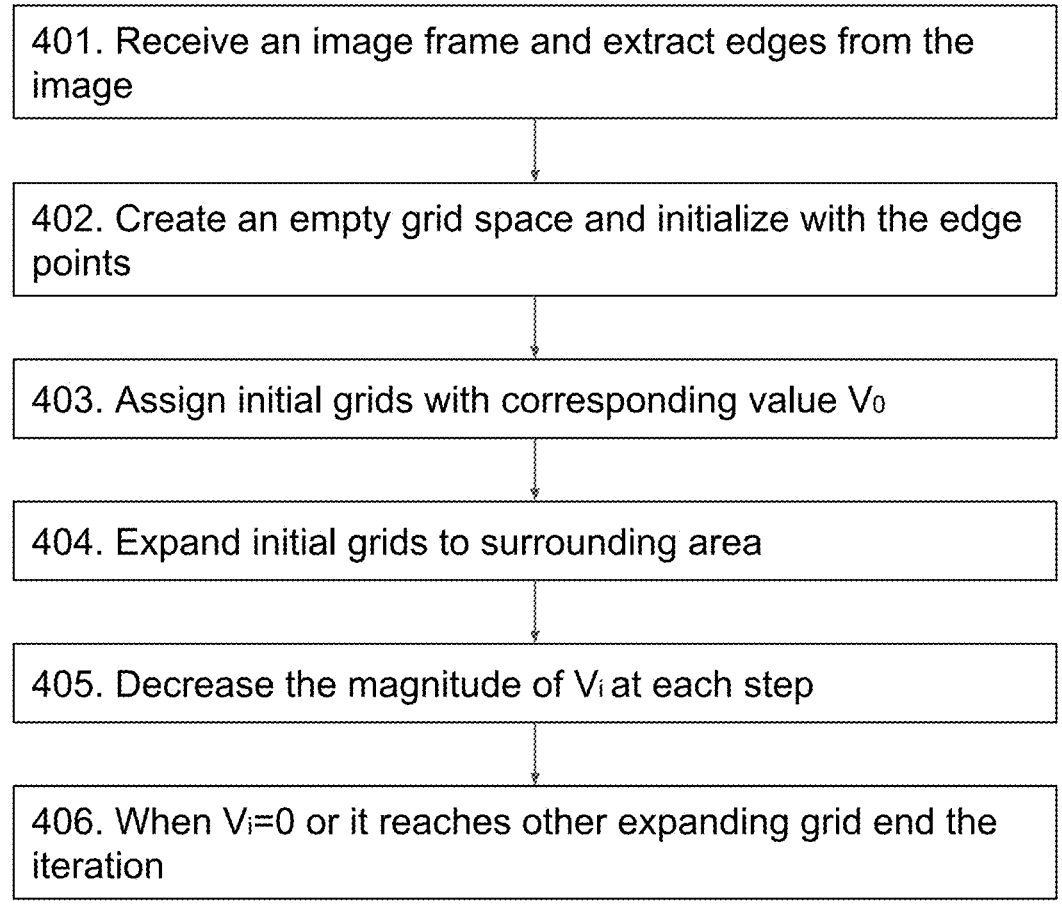
FIG. 4 is a flowchart illustrating the creation of a synthetic gradient field based upon camera imaging.

FIG. 4 shows the process for creating the SGF based on the 2D edge image. For example, the process starts in step 401 wherein the system receives an image frame and edges are extracted from the image (see step 304 in FIG. 3). Next, in step 402, an empty grid space is created with the image size and is initialized with the edge points. This initial grid is a synthetically created grid by the CPU 23. The grid can then be assigned a corresponding value such as 11 in step 403 (the initial value 11 can have different values for different initial grids or take the same value for all grids). The initial value 11 can be a scalar value (either positive or negative) or a two or higher dimensional vector value. For example, the initial value 11 can be assigned with the value 1 for all edge points, assigned with the normalized unit 2-vector gradient value, or both. Next, in step 404, the initial grids expanded to a surrounding area as shown by FIG. 1B. This expansion can be either moving inward from the initial grid or outward from the grid. This expansion occurs iteratively for N steps. For each step in the expansion 405, the initial value 11 is changed by N based upon the following formula: $V_i=(V_{i-1})-(V_0/N)$, where $V_0$ is the initial value 11, N is the number of iterations, $V_0/N$ is the step value, and $V_i$ is the grid value at step i. In step 406, when the value of $V_i$ approaches 0 or it reaches other expanding grids, these steps are stopped and the SGF is considered formed.

Figure 5:
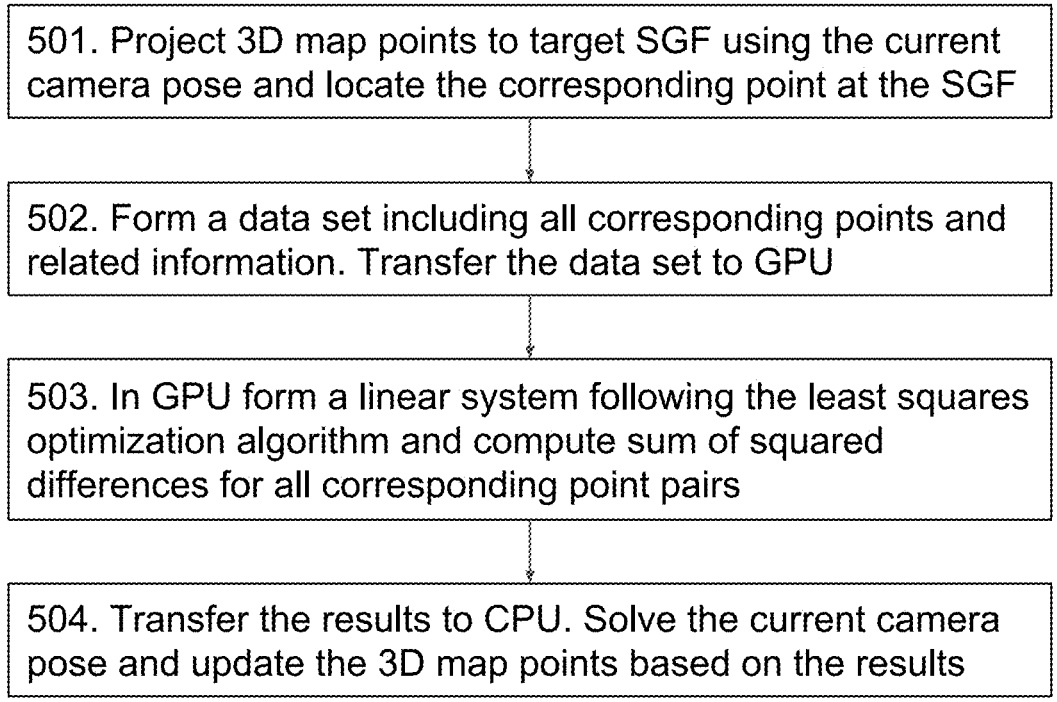
FIG. 5 is a flowchart illustrating the least squares optimization for computing both camera pose and 3D map points.

FIG. 5 shows the least squares optimization for computing both the camera pose and the 3D map points. For example, the process starts in step 501 wherein 3D map points are projected onto the SGF created from the target image based on the current camera pose and the locations of 3D map points. For each projected 3D map point, a corresponding point is located from the target SGF. In step 502, a data set is formed for all corresponding point pairs including all information needed for the least squares optimization. The accumulated data set processed in the CPU 23 is then transferred to the parallel processing unit (GPU) 24 to achieve a computational efficiency. In step 503, the GPU 24 forms a linear system of the data set in parallel for the least squares optimization and computes the sum of squared differences for all corresponding point pairs. The sum of squared differences is computed between the initial value 11 from the 3D map point and the grid value $V_i$ from the SGF. After these computations, the GPU 24 will gather the results and reduce the camera pose-related parameters. In step 504, the GPU 24 transfer the results back to CPU 23. The CPU 23 solves the camera pose and updates the 3D map points based on the results from the GPU, all of which are stored on the computer-readable non-transitory storage medium.

Ultimately, the SGF is used in the process to provide two core components for use in the least squares optimization method. First, the SGF uses a projective data association method so as to compute an error between directly associated elements in 2D grid without an explicit data association procedure. Alternatively, indirect methods optimize a geometric error, since the pre-computed values like feature point locations are geometric quantities.

Furthermore, the SGF can provide a dense continuous gradient function in a discrete feature space. In contrast to simply comparing two edge shapes, such as a reference edge from projected 3D map points and a target edge from captured image frame, a SGF changes grid values smoothly over expanded spaces to provide a well-defined converging behavior for optimization. Thus, this dense continuous gradient function creates a more accurate model than directly comparing two raw edge shapes.

Figure 6A:
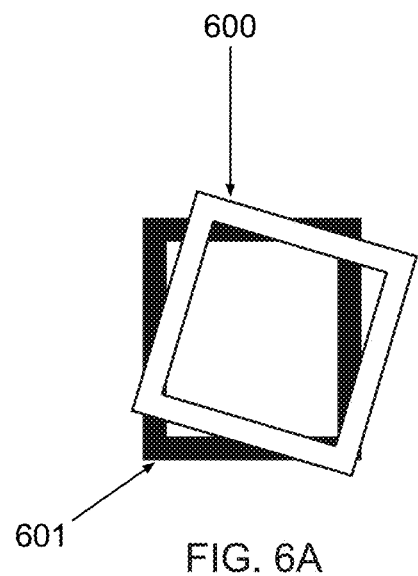
FIG. 6A illustrates tracking the movement of an object through 3D space using an original edge shape in 2D space.
Figure 6B:
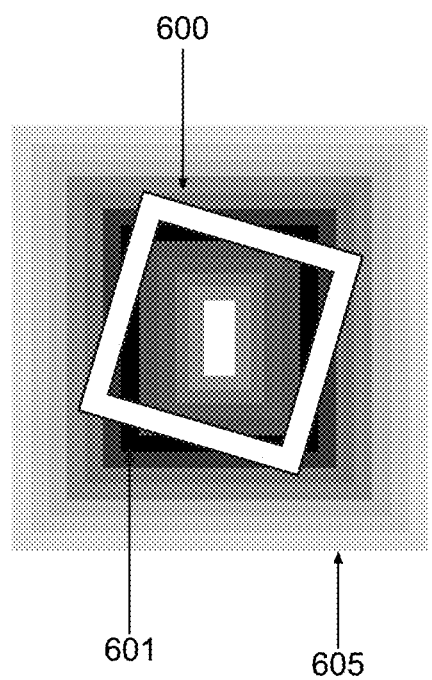
FIG. 6B illustrates tracking the movement of an object through 3D space using a synthetic gradient field in 2D space.

FIGS. 6A and 6B show a diagram of two different solutions for calculating the relative pose using a least squares optimization method. For example, FIG. 6A shows the matching of a reference edge image 600 at pose $P_0$ placed in reference to a target edge image 601 at pose $P_1$ in a 2D space such as using the process shown in FIG. 3. FIG. 6B shows the matching of a reference edge image 600 at pose $P_0$ placed in reference to a SGF 605 created from the target edge image 601 at pose $P_1$ of FIG. 6A. As shown, the SGF provides a more thorough, dense and more intricate structure which allows the least squares optimization method to provide a more accurate comparison of the reference edge image when compared to the SGF over the method shown using the edge of FIG. 6A. With the SGF, the explicit feature data association problem simply becomes a direct projective association problem providing the innate dense gradient structure of the SGF.

Ultimately these SGFs are generated to create a more comprehensive structure of the feature data, as well as to perform a more accurate computation of a pose of an image sensor 30-33, or a sensor platform such as sensor platform 20 in that space.

The method of the present invention is a processor-implemented method comprising the steps of: receiving a sequence of image frames from a camera 30-33, extracting edges for each image frame, calculating an intensity gradient value for each edge point, building a 3D map of the surrounding environment by initializing 3D points in 3D spaces and continuously optimizing the 3D coordinates of each 3D map point, generating a synthetic gradient field based on an edge image, and tracking the pose of said camera by computing transformation parameters for each image frame, wherein the transformation parameters further comprise parameters for aligning each synthetic gradient field to the 3D map of the environment and wherein computing the transformation parameters and optimizing the map comprises using an iterative process to identify corresponding points from both the synthetic gradient field and the 3D map points and optimizing an error metric applied to the identified corresponding points.

The method further comprises receiving input from a second sensor associated with said camera and using said second sensor to form an initial estimate of the transformation parameters, the second sensor being selected from any of: a depth map camera 32, a stereo camera 33, an orientation sensor, a movement sensor, or a position sensor. The method further comprises a parallel computing unit adapted to generate an error metric, wherein a linear system is formed using a numerical least squares optimization for each pair of corresponding points and wherein said parallel computing unit processes the linear system. The results are passed to the microprocessor 23 to solve the transformation parameters of the cameras 30-33.

The method further comprises initializing a map of the surrounding environment comprises extracting edges from an image frame and back projecting 2D edge points into 3D space with random initial depth values, wherein each 3D map point keeps the intensity gradient value computed at corresponding 2D edge point. Next, an image frame captured by said camera 30-33 is processed to form a synthetic gradient field, and wherein the formation of a synthetic gradient field comprises capturing an image by said camera 30-33, extracting the edges from said image, and computing the intensity gradient value for each edge point, wherein the formation of a synthetic gradient field comprises creating an empty grid field with the dimension of the image, initializing the synthetic gradient field from the location of edge points, and assigning initial grids with corresponding intensity gradient value, wherein the synthetic gradient field expands the initial grids to surrounding area and decreases the magnitude of the intensity gradient value at each step, and wherein the formation of a synthetic gradient field is finished when the magnitude of the intensity gradient value become zero or reaches another expanding grid.

The method further comprises identifying corresponding points in pairs of the synthetic gradient field and the 3D map points comprises using a projective data association process whereby an estimated pose of the mobile camera is used to project 3D map points onto the synthetic gradient field. Next, optimization of the transformation parameters of the camera 30-33 and the 3D coordinates of the 3D map points comprises using an iterative process to identify corresponding points from both synthetic gradient fields and the 3D map points and jointly optimize an error metric applied to the identified corresponding points. Optimizing the error metric comprises optimizing a sum of squared differences between the intensity gradient values from a projected 3D map point on the synthetic gradient field and an associated corresponding point from the synthetic gradient field.

While a particular form of the invention has been illustrated and described, it will be apparent that various modifications can be made without departing from the spirit and scope of the invention. For example, while several components are provided in the sensor platform 20, additional components and configurations may be used to provide improved location sensing or image generation. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A processor-implemented method for visual simultaneous localization and mapping, the method comprising the steps:
receiving a sequence of image frames from a camera;
extracting edges for each image frame;
calculating an intensity gradient value for each edge point;
building a 3D map of the surrounding environment by initializing 3D points in 3D spaces and continuously optimizing the 3D coordinates of each 3D map point;
generating a synthetic gradient field based on an edge image;
tracking the pose of said camera by computing transformation parameters for each image frame, wherein the transformation parameters further comprise parameters for aligning each synthetic gradient field to the 3D map of the environment;
wherein computing the transformation parameters and optimizing the map comprises using an iterative process to identify corresponding points from both the synthetic gradient field and the 3D map points and optimizing an error metric applied to the identified corresponding points; and
wherein initializing a map of the surrounding environment comprises extracting edges from an image frame and back projecting 2D edge points into 3D space with random initial depth values, wherein each 3D map point keeps the intensity gradient value computed at corresponding 2D edge point.

2. The method of claim 1, further comprising receiving input from a second sensor associated with said camera and using said second sensor to form an initial estimate of the transformation parameters, the second sensor being selected from any of: a depth map camera, a stereo camera, an orientation sensor, a movement sensor, or a position sensor.

3. The method of claim 1, further comprising a parallel computing unit adapted to generate an error metric, wherein a linear system is formed using a numerical least squares optimization for each pair of corresponding points and wherein said parallel computing unit processes the linear system.

4. The method of claim 3, further comprising passing the results to a central processing unit to solve the transformation parameters of the camera.

5. The method of claim 1, wherein an image frame captured by said camera is processed to form a synthetic gradient field, and wherein the formation of a synthetic gradient field comprises capturing an image by said camera, extracting the edges from said image, and computing the intensity gradient value for each edge point, wherein the formation of a synthetic gradient field comprises creating an empty grid field with the dimension of the image, initializing the synthetic gradient field from the location of edge points, and assigning initial grids with corresponding intensity gradient value, wherein the synthetic gradient field expands the initial grids to surrounding area and decreases the magnitude of the intensity gradient value at each step, and wherein the formation of a synthetic gradient field is finished when the magnitude of the intensity gradient value become zero or reaches another expanding grid.

6. The method of claim 5, wherein identifying corresponding points in pairs of the synthetic gradient field and the 3D map points comprises using a projective data association process whereby an estimated location of the mobile camera is used to project 3D map points onto the synthetic gradient field.

7. The method of claim 5, wherein computing the transformation parameters of the mobile camera and optimization of the 3D coordinates of the 3D map points comprises using an iterative process to identify corresponding points from both synthetic gradient fields and the 3D map points and jointly optimize an error metric applied to the identified corresponding points.

8. The method of claim 7, wherein optimizing the error metric comprises optimizing a sum of squared differences between the intensity gradient values from a projected 3D map point on the synthetic gradient field and an associated corresponding point from the synthetic gradient field.

9. A visual simultaneous localization and mapping system comprising:
a sensor platform comprising at least one microprocessor, at least one image sensor, and a non-transitory computer-readable storage medium in electrical communication with said at least one microprocessor, and at least one image sensor;
wherein said at least one image sensor is adapted to take a plurality of images of a surrounding space and wherein said at least one microprocessor is adapted to calculate at least one synthetic gradient field to estimate the movements and the surroundings of said sensor platform in a space, and wherein said images and said synthetic gradient field are stored on said non-transitory computer-readable storage medium; and
wherein said at least one image sensor is a camera, and wherein sensor platform is configured to:
initialize the sensor platform using said at least one microprocessor at an origin point;
capture an image frame by said camera;
build a 3D map of the surrounding environment by initializing 3D points in 3D space;
move said sensor platform to a new location;
capture a new image frame using said camera;
generate a synthetic gradient field based upon an edge image;
identify the corresponding points from the synthetic gradient fields and 3D map points to compute said transformation parameters and optimize the map;
track the pose of the camera by computing transformation parameters for the new image frame, said transformation parameters being parameters for aligning the synthetic gradient field and the 3D map of the environment;
calculate the optimal value of the current pose of the camera and 3D coordinates of 3D map points using an iterative least squares optimization; and
update the current sensor platform's pose and 3D map points using the optimal value of the current computation.

10. The system of claim 9, further comprising a second sensor in electrical communication with said sensor platform, wherein said second sensor is adapted to take at least one location in space of said sensor platform for improving the accuracy of localization and mapping, the second sensor being selected from any of: a depth map camera, a stereo camera, an orientation sensor, a movement sensor, or a position sensor.

11. The system of claim 9, further comprising a housing, wherein sensor platform comprising said at least one microprocessor, said at least one image sensor, and said non-transitory computer-readable storage medium are disposed in said housing.

12. The system of claim 9, further comprising building a map of the surroundings of said sensor platform, localizing itself properly within said map, and calculating the relative transformation between different camera poses.

13. The system of claim 9, wherein said at least one microprocessor creates a synthetic gradient field.

* * * * *